United States Patent
Yoo et al.

(10) Patent No.: US 11,289,769 B2
(45) Date of Patent: *Mar. 29, 2022

(54) BINDERS FOR WET AND DRY LAMINATION OF BATTERY CELLS

(71) Applicant: Apple Inc., Cupertino, CA (US)

(72) Inventors: Mikyong Yoo, Palo Alto, CA (US); Richard M. Mank, Los Altos, CA (US); Bookeun Oh, Fremont, CA (US)

(73) Assignee: Apple Inc., Cupertino, CA (US)

(*) Notice: Subject to any disclaimer, the term of this patent is extended or adjusted under 35 U.S.C. 154(b) by 53 days.

This patent is subject to a terminal disclaimer.

(21) Appl. No.: 16/846,783

(22) Filed: Apr. 13, 2020

(65) Prior Publication Data

US 2020/0243826 A1    Jul. 30, 2020

Related U.S. Application Data

(63) Continuation of application No. 16/114,786, filed on Aug. 28, 2018, now Pat. No. 10,665,840, which is a
(Continued)

(51) Int. Cl.
*H01M 50/411* (2021.01)
*H01M 10/0525* (2010.01)
(Continued)

(52) U.S. Cl.
CPC ......... *H01M 50/411* (2021.01); *H01M 4/133* (2013.01); *H01M 4/623* (2013.01);
(Continued)

(58) Field of Classification Search
CPC ............. H01M 50/411; H01M 50/431; H01M 50/449; H01M 4/623; H01M 10/0525;
(Continued)

(56) References Cited

U.S. PATENT DOCUMENTS

| 5,902,697 A | 5/1999 | Guindy et al. |
| 6,063,519 A | 5/2000 | Barker et al. |

(Continued)

FOREIGN PATENT DOCUMENTS

| CN | 1257612 A | 6/2000 |
| CN | 101005129 A | 7/2007 |

(Continued)

*Primary Examiner* — Stewart A Fraser
(74) *Attorney, Agent, or Firm* — BakerHostetler

(57) ABSTRACT

Cell stacks are presented that include binders for wet and dry lamination processes. The cell stacks, when laminated, produce battery cells (or portions thereof). The cell stacks include a cathode having a cathode active material disposed on a cathode current collector. The cell stacks also include an anode having an anode active material disposed on an anode current collector. The anode is oriented towards the cathode such that the anode active material faces the cathode active material. A separator is disposed between the cathode active material and the anode active material and comprising a binder comprising a PVdF-HFP copolymer. In certain instances, an electrolyte fluid is in contact with the separator. Methods of laminating the cell stacks are also presented.

20 Claims, 3 Drawing Sheets

Related U.S. Application Data continuation of application No. 15/727,988, filed on Oct. 9, 2017, now Pat. No. 10,074,838, which is a continuation of application No. 15/449,494, filed on Mar. 3, 2017, now Pat. No. 9,786,887, which is a continuation-in-part of application No. 15/375,905, filed on Dec. 12, 2016, now abandoned.

(60) Provisional application No. 62/303,276, filed on Mar. 3, 2016.

(51) Int. Cl.
*H01M 10/0585* (2010.01)
*H01M 10/0587* (2010.01)
*H01M 4/133* (2010.01)
*H01M 4/66* (2006.01)
*H01M 50/431* (2021.01)
*H01M 50/449* (2021.01)
*H01M 4/62* (2006.01)

(52) U.S. Cl.
CPC ....... *H01M 4/661* (2013.01); *H01M 10/0525* (2013.01); *H01M 10/0585* (2013.01); *H01M 10/0587* (2013.01); *H01M 50/431* (2021.01); *H01M 50/449* (2021.01); *H01M 2220/30* (2013.01)

(58) Field of Classification Search
CPC ......... H01M 10/0585; H01M 10/0587; H01M 4/133; H01M 4/661; H01M 2220/30
See application file for complete search history.

(56) References Cited

U.S. PATENT DOCUMENTS

| | | |
|---|---|---|
| 9,786,887 B2 | 10/2017 | Yoo et al. |
| 10,074,838 B2 * | 9/2018 | Yoo .................. H01M 50/431 |
| 2003/0114614 A1 | 6/2003 | Wille et al. |
| 2004/0188880 A1 | 9/2004 | Bauer et al. |
| 2005/0277026 A1 | 12/2005 | Nishikawa et al. |
| 2008/0292968 A1 | 11/2008 | Lee et al. |
| 2010/0316903 A1 | 12/2010 | Kim et al. |
| 2011/0045338 A1 | 2/2011 | Bae et al. |
| 2011/0217585 A1 | 9/2011 | Wang et al. |
| 2013/0202944 A1 | 8/2013 | Song et al. |
| 2013/0224552 A1 | 8/2013 | Hong et al. |
| 2013/0224556 A1 | 8/2013 | Hong et al. |
| 2014/0030578 A1 | 1/2014 | Hoshiba et al. |
| 2014/0272543 A1 | 9/2014 | Devan et al. |
| 2015/0093629 A1 | 4/2015 | Sayre et al. |
| 2015/0179999 A1 | 6/2015 | Kim |
| 2015/0372277 A1 | 12/2015 | Honda |
| 2016/0164060 A1 * | 6/2016 | Zhang ................. H01M 50/426 429/145 |
| 2016/0190536 A1 * | 6/2016 | Park .................... H01M 50/411 429/144 |
| 2018/0034030 A1 | 2/2018 | Yoo et al. |

FOREIGN PATENT DOCUMENTS

| | | |
|---|---|---|
| CN | 101717464 | 6/2010 |
| CN | 102134329 A | 7/2011 |
| CN | 102683629 | 9/2012 |
| CN | 103184013 | 7/2013 |
| WO | WO 1998/044576 A1 | 10/1998 |
| WO | WO 01/61772 | 8/2001 |
| WO | WO 2012/037426 | 3/2012 |

* cited by examiner

BINDERS FOR WET AND DRY LAMINATION OF BATTERY CELLS

CROSS-REFERENCE TO RELATED APPLICATION(S)

The present application is a continuation of U.S. patent application Ser. No. 16/114,786, entitled "Binders for Wet and Dry Lamination of Batter Cells," filed on Aug. 28, 2018, which is a continuation of U.S. patent application Ser. No. 15/727,988, entitled "Binders for Wet and Dry Lamination of Battery Cells," filed on Oct. 9, 2017, which is a continuation of U.S. patent application Ser. No. 15/449,494, entitled "Binders for Wet and Dry Lamination of Battery Cells," filed on Mar. 3, 2017, now U.S. Pat. No. 9,786,887, which is a continuation-in-part of U.S. patent application Ser. No. 15/375,905, entitled "Binders for Wet and Dry Lamination of Battery Cells," filed on Dec. 12, 2016, which claims the benefit under 35 U.S.C. § 119(e) of U.S. Provisional Patent Application Ser. No. 62/303,276, entitled "Binders for Wet and Dry Lamination of Battery Cells," filed on Mar. 3, 2016. The content of all patent applications is incorporated herein by reference in its entirety.

FIELD

This disclosure relates generally to battery cells, and more particularly, to binders for wet and dry lamination of battery cells.

BACKGROUND

Battery cells are often manufactured using lamination processes that adhere a separator to one or more electrodes, such as a cathode or an anode. These lamination processes may involve "wet" processes, where the separator is soaked in electrolyte fluid, or "dry" processes, where electrolyte fluid is absent in the separator. During manufacturing, a battery cell may experience a combination "wet" lamination processes and "dry" lamination processes. To facilitate adhesion of the separator to the electrodes, the separator includes a binder, which may be deposited as a coating thereon. Binders suitable for both "wet" lamination processes and "dry lamination "processes" are desirable in battery manufacturing.

SUMMARY

The embodiments presented herein relate to cell stacks that include binders for wet and dry lamination processes. The cell stacks, when laminated, produce battery cells (or portions thereof). The cell stacks include a cathode having a cathode active material disposed on a cathode current collector. The cell stacks also include an anode having an anode active material disposed on an anode current collector. The anode is oriented towards the cathode such that the anode active material faces the cathode active material. A separator is disposed between the cathode active material and the anode active material and comprising a binder comprising a PVdF-HFP copolymer. In certain instances, an electrolyte fluid is in contact with the separator.

In some variations, the PVdF-HFP copolymer has a molecular weight greater than or equal to 1,000,000 u and a weight percent of HFP from 5 to 15 percent. In other variations, the binder is a blended binder that includes a first PVdF-HFP copolymer and a second PVdF-HFP copolymer. The first PVdF-HFP copolymer has a first molecular weight greater than or equal to 1,000,000 u and a first weight percent of HFP less than or equal to 7 percent. The second PVdF-HFP copolymer has a second molecular weight from 500,000 to 1,000,000 u and a second weight percent of HFP from 10 to 15 percent.

The embodiments presented herein also describe methods for laminating cell stacks of battery cells. The methods may involve both wet and dry lamination. The methods include the step of contacting a separator with a first active material of a first electrode to form a first cell stack. The separator includes a binder comprising a PVdF-HFP copolymer. The methods also include the step of heating the first cell stack to laminate the separator to the first electrode. In certain instances, the methods additionally include soaking the separator with an electrolyte fluid before heating the first cell stack.

In some variations of the methods, the PVdF-HFP copolymer has a molecular weight greater than or equal to 1,000,000 u and a weight percent of HFP from 5 to 15 percent. In other variations of the methods, the binder is a blended binder that includes a first PVdF-HFP copolymer and a second PVdF-HFP copolymer. The first PVdF-HFP copolymer has a first molecular weight greater than or equal to 1,000,000 u and a first weight percent of HFP less than or equal to 7 percent. The second PVdF-HFP copolymer has a second molecular weight from 500,000 to 1,000,000 u and a second weight percent of HFP from 10 to 15 percent.

Other cell stacks and methods of laminating are presented.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1:
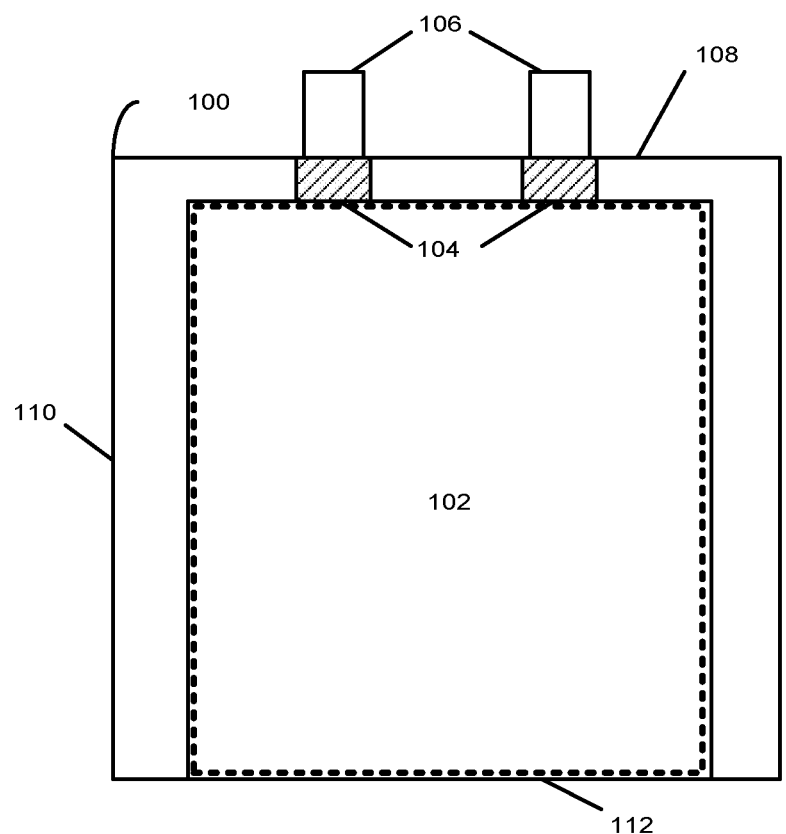
FIG. 1 is a top-down view of a battery cell in accordance with an illustrative embodiment.

FIG. 1 presents a top-down view of a battery cell 100 in accordance with an embodiment. The battery cell 100 may correspond to a lithium-ion or lithium-polymer battery cell that is used to power a device used in a consumer, medical, aerospace, defense, and/or transportation application. The battery cell 100 includes a stack 102 containing a number of layers that include a cathode with a cathode active coating, a separator, and an anode with an anode active coating. More specifically, the stack 102 may include one strip of cathode active material (e.g., aluminum foil coated with a lithium compound) and one strip of anode active material (e.g., copper foil coated with carbon). The stack 102 also includes one strip of separator material (e.g., a microporous polymer membrane or non-woven fabric mat) disposed between the one strip of cathode active material and the one strip of anode active material. The cathode, anode, and separator layers may be left flat in a planar configuration or may be wrapped into a wound configuration (e.g., a "jelly roll").

During assembly of the battery cell 100, the stack 102 can be enclosed in a flexible pouch. The stack 102 may be in a planar or wound configuration, although other configurations are possible. The flexible pouch is formed by folding a flexible sheet along a fold line 112. In some instances, the flexible sheet is made of aluminum with a polymer film, such as polypropylene. After the flexible sheet is folded, the flexible sheet can be sealed, for example, by applying heat along a side seal 110 and along a terrace seal 108. The flexible pouch may be less than or equal to 120 microns thick to improve the packaging efficiency of the battery cell 100, the density of battery cell 100, or both.

The stack 102 also includes a set of conductive tabs 106 coupled to the cathode and the anode. The conductive tabs 106 may extend through seals in the pouch (for example, formed using sealing tape 104) to provide terminals for the battery cell 100. The conductive tabs 106 may then be used to electrically couple the battery cell 100 with one or more other battery cells to form a battery pack. For example, the battery pack may be formed by coupling the battery cells in a series, parallel, or a series-and-parallel configuration. Such coupled cells may be enclosed in a hard case to complete the battery pack, or may be embedded within an enclosure of a portable electronic device, such as a laptop computer, tablet computer, mobile phone, personal digital assistant (PDA), digital camera, and/or portable media player.

Figure 2:
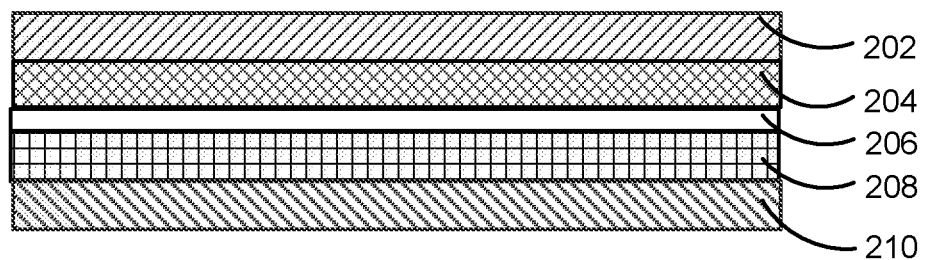
FIG. 2 is a side view of a set of layers for a battery cell in accordance with an illustrative embodiment.

FIG. 2 presents a side view of a set of layers for a battery cell (e.g., the battery cell 100 of FIG. 1) in accordance with the disclosed embodiments. The set of layers may include a cathode current collector 202, a cathode active coating 204, a separator 206, an anode active coating 208, and an anode current collector 210. The cathode current collector 202 and the cathode active coating 204 may form a cathode for the battery cell, and the anode current collector 210 and the anode active coating 208 may form an anode for the battery cell. To create the battery cell, the set of layers may be stacked in a planar configuration, or stacked and then wrapped into a wound configuration. Before assembly of the battery cell, the set of layers may correspond to a cell stack.

As mentioned above, the cathode current collector 202 may be an aluminum foil, the cathode active coating 204 may be a lithium compound, the anode current collector 210 may be a copper foil, the anode active coating 208 may be carbon, and the separator 206 may include a microporous polymer membrane or non-woven fabric mat. Non-limiting examples of the microporous polymer membrane or non-woven fabric mat include microporous polymer membranes or non-woven fabric mats of polyethylene (PE), polypropylene (PP), polyamide (PA), polytetrafluoroethylene (PTFE), polyvinyl chloride (PVC), polyester, and polyvinylidene difluoride (PVdF). However, other microporous polymer membranes or non-woven fabric mats are possible (e.g., gel polymer electrolytes).

In general, separators represent structures in a battery, such as interposed layers, that prevent physical contact of cathodes and anodes while allowing ions to transport therebetween. Separators are formed of materials having pores that provide channels for ion transport, which may include absorbing an electrolyte fluid that contains the ions. Materials for separators may be selected according to chemical stability, porosity, pore size, permeability, wettability, mechanical strength, dimensional stability, softening temperature, and thermal shrinkage. These parameters can influence battery performance and safety during operation. Separators may incorporate binders to improve adhesion to adjacent electrode layers (i.e., layers of the cathode and the anode). These binders may also allow ceramic materials to adhere to separators (e.g., fillers and layers), thereby increasing a separator's mechanical strength and resistance to thermal shrinkage. Materials for binders may be selected according to a wet lamination process, where the set of layers of the battery cell is laminated with a separator soaked in electrolyte fluid, and a dry lamination process, where the set of layers of the battery cell is laminated using a separator without electrolyte fluid. Binders that allow the battery cell to undergo both wet lamination and dry lamination can be advantageous in reducing material and processing complexities for battery cell manufacturing.

Figure 3A:
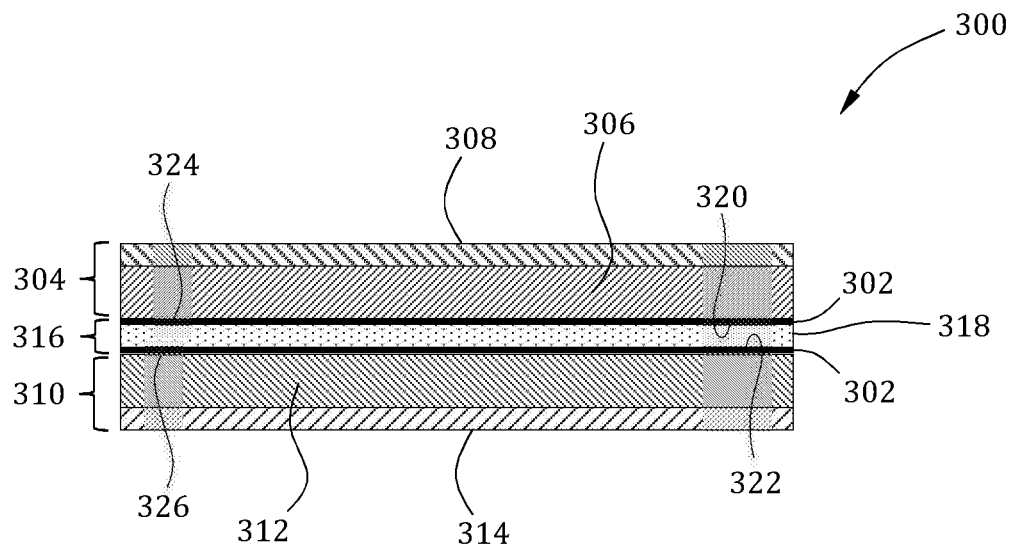
FIG. 3A is a side view of a cell stack having a binder suitable for both wet lamination and dry lamination, according to an illustrative embodiment.

FIG. 3A presents a side view of a cell stack 300 having a binder 302 suitable for both wet lamination and dry lamination, according to an illustrative embodiment. The cell stack 300, when laminated, may produce a lithium-ion battery cell. The cell stack 300 includes a cathode 304 having a cathode active material 306 disposed on a cathode current collector 308. The cell stack 300 also includes an anode 310 having an anode active material 312 disposed on an anode current collector 314. The anode 310 is oriented with respect to the cathode 304 such that the anode active material 312 faces the cathode active material 306.

A separator 316 is disposed between the cathode active material 306 and the anode active material 312 and includes a binder 302 comprising a polyvinylidene difluoride-hexafluoropropylene copolymer (i.e., a PVdF-HFP copolymer). In some embodiments, the cell stack 300 further includes an electrolyte fluid in contact with the separator 316. In these embodiments, the separator 316 may be soaked in the electrolyte fluid. The electrolyte fluid may be any type of electrolyte fluid suitable for battery cells. Non-limiting examples of the electrolyte fluid include propylene carbonate, ethylene carbonate, dimethyl carbonate, diethyl carbonate, and ethyl-methyl carbonate. The electrolyte fluid may also have a salt dissolved therein. The salt may be any type of salt suitable for battery cells. For example, and without limitation, salts for a lithium-ion battery cell include $LiPF_6$, $LiBF_4$, $LiClO_4$, $LiSO_3CF_3$, $LiN(SO_2CF_3)_2$, $LiBC_4O_8$, $Li[PF_3(C_2CF_5)_3]$, and $LiC(SO_2CF_3)_3$. Other salts are possible, including combinations of salts.

Separator 316 may include a microporous polymer membrane or non-woven fabric mat 318, as shown in FIG. 3A. The microporous polymer membrane or non-woven fabric mat 318 may be any type of microporous polymer membrane or non-woven fabric mat suitable for battery cells (e.g., a polymer membrane, a gel polymer, etc.). Non-limiting examples of the microporous polymer membrane or non-woven fabric mat 318 include microporous polymer membranes or non-woven fabric mats of polyethylene (PE), polypropylene (PP), polyamide (PA), polytetrafluoroethylene (PTFE), polyvinyl chloride (PVC), polyester, and polyvinylidene difluoride (PVdF). In some instances, the separator 316 incorporates ceramic particles therein (i.e., as a filler), which may involve the binder 302, the woven or non-woven type microporous membrane 318, or both. Non-limiting examples of ceramic materials for the ceramic particles include magnesium oxide materials (e.g., Mg(OH)$_2$, MgO, etc.) and aluminum oxide materials (e.g., Al$_2$O$_3$). Other ceramic materials, however, are possible.

In FIG. 3A, the binder 302 is depicted as layers disposed on the microporous polymer membrane or non-woven fabric mat 318. However, this depiction is not intended as limiting. For example, and without limitation, the binder 302 may also be present, in whole or in part, within pores of the microporous polymer membrane or non-woven fabric mat 318. Other configurations of the binder 302 are possible.

The PVdF-HFP copolymer of the binder 302 may have a molecular weight, a weight percent HFP, an acid value, or any combination thereof, that allows the battery stack 300 to be manufactured using a wet lamination process, a dry lamination process, or both. Without wishing to be limited to a particular theory or mode of action, PVdF is a semi-crystalline polymer material with a relatively high melting temperature (i.e., T$_m$>170° C.) and a low swelling in electrolyte fluid. Progressive incorporation of HFP into the semi-crystalline polymer material (i.e., of PVdF) yields a copolymer of increasing amorphous content, decreasing melting temperature, and increasing swelling in electrolyte fluid. By selecting the molecular weight and the weight percent of HFP, these properties can be manipulated to better suit the copolymer to wet lamination processing, dry lamination processing, or both. However, it will be appreciated that suitability for dry lamination may run counter to suitability for wet lamination (and vice versa).

For example, and without limitation, the weight percent of HFP can be increased to lower a softening point of the copolymer, making the copolymer more suitable for dry lamination. However, this increase in weight percent also increases a susceptibility of the copolymer to swelling during wet lamination. Swelling during wet lamination can degrade contact between the separator 316 and adjacent cathode 304 and anode 310, which can result in a loss of contact area.

In another non-limiting example, a molecular weight of the PVdF-HFP copolymer may be increased to improve an interaction of the copolymer with components contacted by the binder 302 (e.g., the microporous polymer membrane or non-woven fabric mat 318, the cathode active material 306, the anode active material 312, etc.). Such improved interaction can enhance adhesion during wet or dry lamination. However, increasing the molecular weight may also increase the softening point of the copolymer, making the copolymer less suitable for dry lamination.

In yet another non-limiting example, an amorphous content of the PVdF-HFP copolymer may be increased to improve a coating of the copolymer onto components contacted by the binder 302 (e.g., the microporous polymer membrane or non-woven fabric mat 318, the cathode active material 306, the anode active material 312, etc.). Higher amorphous content in the copolymer can increase its ductility and lower a risk of microvoids between the copolymer and contacted components. However, increasing the amorphous content may also increase the degree of swelling of the copolymer, making the copolymer less suitable for wet lamination.

The embodiments disclosed herein are directed towards binders that comprise a PVdF-HFP copolymer with a molecular weight and a weight percent HFP suitable for both wet and dry processing. Moreover, the PVdF-HFP copolymer has an acid value that corresponds to enhanced adhesion of the binder 302 to components of the cell stack 300 (e.g., the microporous polymer membrane or non-woven fabric mat 318, the cathode active material 306, the anode active material 312, etc.) The acid value characterizes a quantity of acidic functional groups disposed along a polymer chain of the PVdF-HFP copolymer. The presence of these functional groups can improve bonding of the PVdF-HFP copolymer to components contacted by the binder 302. Non-limiting examples of acidic functional groups include carboxyl groups (e.g., formic acid, acetic acid, etc.) and hydroxyl groups. Other acid functional groups, however, are possible.

In various aspects, the acid value is a quantity of base required to neutralize an acidity of a given quantity of chemical substance. As used herein, the acid value refers to a number of milligrams of potassium hydroxide needed to neutralize a given number of grams of PVdF-HFP copolymer. Other equivalent units of measurement, however, are possible for the acid value. Techniques to determine the acid value (and their corresponding measurement units) are known to those skilled in the art and will not be discussed further.

In one variation, the PVdF-HFP copolymer has a molecular weight greater than or equal to 1,000,000 u and a weight percent of HFP from 5 to 15 percent. In further embodiments, the PVdF-HFP copolymer has an acid value from 3 to 15 milligrams of potassium hydroxide per gram of copolymer. In further embodiments, the PVdF-HFP copolymer has an acid value from 1.5 to 15 milligrams of potassium hydroxide per gram of copolymer.

In some embodiments, the PVdF-HFP copolymer has a molecular weight greater than or equal to 1,000,000 u and a weight percent of HFP greater than or equal to 5 percent. In some embodiments, the PVdF-HFP copolymer has a molecular weight greater than or equal to 1,000,000 u and a weight percent of HFP greater than or equal to 10 percent. In some embodiments, the PVdF-HFP copolymer has a molecular weight greater than or equal to 1,000,000 u and a weight percent of HFP greater than or equal to 15 percent. In some embodiments, the PVdF-HFP copolymer has a molecular weight greater than or equal to 1,000,000 u and a weight percent of HFP greater than or equal to 20 percent.

In some embodiments, the PVdF-HFP copolymer has a molecular weight greater than or equal to 1,000,000 u and a weight percent of HFP less than or equal to 25 percent. In some embodiments, the PVdF-HFP copolymer has a molecular weight greater than or equal to 1,000,000 u and a weight percent of HFP less than or equal to 20 percent. In some embodiments, the PVdF-HFP copolymer has a molecular weight greater than or equal to 1,000,000 u and a weight percent of HFP less than or equal to 15 percent. In some embodiments, the PVdF-HFP copolymer has a molecular weight greater than or equal to 1,000,000 u and a weight percent of HFP less than or equal to 10 percent.

In some embodiments, the PVdF-HFP copolymer has an acid value greater than or equal to 1.5 milligrams of potassium hydroxide per gram of copolymer. In some embodiments, the PVdF-HFP copolymer has an acid value greater than or equal to 1.8 milligrams of potassium hydroxide per gram of copolymer. In some embodiments, the PVdF-HFP copolymer has an acid value greater than or equal to 3 milligrams of potassium hydroxide per gram of copolymer. In some embodiments, the PVdF-HFP copolymer has an acid value greater than or equal to 8 milligrams of potassium hydroxide per gram of copolymer. In some embodiments, the PVdF-HFP copolymer has an acid value greater than or equal to 13 milligrams of potassium hydroxide per gram of copolymer. In some embodiments, the PVdF-HFP copolymer has an acid value greater than or equal to 12 milligrams of potassium hydroxide per gram of copolymer. In some embodiments, the PVdF-HFP copolymer has an acid value greater than or equal to 18 milligrams of potassium hydroxide per gram of copolymer.

In some embodiments, the PVdF-HFP copolymer has an acid value less than 20 milligrams of potassium hydroxide per gram of copolymer. In some embodiments, the PVdF-HFP copolymer has an acid value less than or equal to 15 milligrams of potassium hydroxide per gram of copolymer. In some embodiments, the PVdF-HFP copolymer has an acid value less than or equal to 10 milligrams of potassium hydroxide per gram of copolymer. In some embodiments, the PVdF-HFP copolymer has an acid value less than or equal to 5 milligrams of potassium hydroxide per gram of copolymer.

In another variation, the binder 302 of the separator 316 is a blended binder including a first PVdF-HFP copolymer and a second PVdF-HFP copolymer. The first PVdF-HFP copolymer has a first molecular weight greater than or equal to 1,000,000 u and a first weight percent of HFP less than or equal to 7 percent. The second PVdF-HFP copolymer has a second molecular weight from 500,000 to 1,000,000 u and a second weight percent of HFP from 10 to 15 percent. In further embodiments, the first PVdF-HFP copolymer and the second PVdF-HFP copolymer have respective acid values from 1.5 to 15 milligrams of potassium hydroxide per gram of copolymer.

In some variations, the first PVdF-HFP copolymer and the second PVdF-HFP copolymer have acid values from 1.5 to 15 milligrams of potassium hydroxide per gram of copolymer. In some variations, the first PVdF-HFP copolymer has a first acid value from 1.8 to 2.4 milligrams of potassium hydroxide per gram of copolymer. In some variations, the first PVdF-HFP copolymer has a first acid value of 2.1 milligrams of potassium hydroxide per gram of copolymer. In some variations, the second PVdF-HFP copolymer has a second acid value from 12.3 to 12.9 milligrams of potassium hydroxide per gram of copolymer. In some variations, the second PVdF-HFP copolymer has a second acid value of 12.6 milligrams of potassium hydroxide per gram of copolymer. It will be recognized that the first acid value and second acid value described herein can be combined in any variation.

In some embodiments, the first PVdF-HFP copolymer has a first molecular weight greater than or equal to 1,000,000 u and a first weight percent of HFP less than or equal to 10 percent. In some embodiments, the first PVdF-HFP copolymer has a first molecular weight greater than or equal to 1,000,000 u and a first weight percent of HFP less than or equal to 8 percent. In some embodiments, the first PVdF-HFP copolymer has a first molecular weight greater than or equal to 1,000,000 u and a first weight percent of HFP less than or equal to 6 percent. In some embodiments, the first PVdF-HFP copolymer has a first molecular weight greater than or equal to 1,000,000 u and a first weight percent of HFP less than or equal to 4 percent. In some embodiments, the first PVdF-HFP copolymer has a first molecular weight greater than or equal to 1,000,000 u and a first weight percent of HFP less than or equal to 2 percent.

In some embodiments, the first PVdF-HFP copolymer has a first molecular weight greater than or equal to 1,000,000 u and a first weight percent of HFP from 1 to 3 percent. In some embodiments, the first PVdF-HFP copolymer has a first molecular weight greater than or equal to 1,000,000 u and a first weight percent of HFP from 3 to 5 percent. In some embodiments, the first PVdF-HFP copolymer has a first molecular weight greater than or equal to 1,000,000 u and a first weight percent of HFP from 5 to 7 percent. In some embodiments, the first PVdF-HFP copolymer has a first molecular weight greater than or equal to 1,000,000 u and a first weight percent of HFP from 7 to 9 percent.

In some embodiments, the first PVdF-HFP copolymer has a first molecular weight greater than or equal to 1,000,000 u and a first weight percent of HFP from 1 to 9 percent. In some embodiments, the first PVdF-HFP copolymer has a first molecular weight greater than or equal to 1,000,000 u and a first weight percent of HFP from 3 to 7 percent. In some embodiments, the first PVdF-HFP copolymer has a first molecular weight greater than or equal to 1,000,000 u and a first weight percent of HFP from 1 to 5 percent. In some embodiments, the first PVdF-HFP copolymer has a first molecular weight greater than or equal to 1,000,000 u and a first weight percent of HFP from 5 to 9 percent.

In some embodiments, the second PVdF-HFP copolymer has a second molecular weight greater than or equal to 750,000 u and a second weight percent of HFP less than 14 percent. In some embodiments, the second PVdF-HFP copolymer has a second molecular weight greater than or equal to 750,000 u and a second weight percent of HFP less than 13 percent. In some embodiments, the second PVdF-HFP copolymer has a second molecular weight greater than or equal to 750,000 u and a second weight percent of HFP less than 12 percent. In some embodiments, the second PVdF-HFP copolymer has a second molecular weight greater than or equal to 750,000 u and a second weight percent of HFP less than 11 percent.

In some embodiments, the second PVdF-HFP copolymer has a second molecular weight greater than or equal to 750,000 u and a second weight percent of HFP greater than 11 percent. In some embodiments, the second PVdF-HFP copolymer has a second molecular weight greater than or equal to 750,000 u and a second weight percent of HFP greater than 12 percent. In some embodiments, the second PVdF-HFP copolymer has a second molecular weight greater than or equal to 750,000 u and a second weight percent of HFP greater than 13 percent. In some embodiments, the second PVdF-HFP copolymer has a second molecular weight greater than or equal to 750,000 u and a second weight percent of HFP greater than 14 percent.

In some embodiments, the second PVdF-HFP copolymer has a second molecular weight less than or equal to 750,000 u and a second weight percent of HFP less than 14 percent. In some embodiments, the second PVdF-HFP copolymer has a second molecular weight less than or equal to 750,000 u and a second weight percent of HFP less than 13 percent. In some embodiments, the second PVdF-HFP copolymer has a second molecular weight less than or equal to 750,000 u and a second weight percent of HFP less than 12 percent. In some embodiments, the second PVdF-HFP copolymer has a second molecular weight less than or equal to 750,000 u and a second weight percent of HFP less than 11 percent.

In some embodiments, the second PVdF-HFP copolymer has a second molecular weight less than or equal to 750,000 u and a second weight percent of HFP greater than 11 percent. In some embodiments, the second PVdF-HFP copolymer has a second molecular weight less than or equal to 750,000 u and a second weight percent of HFP greater than 12 percent. In some embodiments, the second PVdF-HFP copolymer has a second molecular weight less than or equal to 750,000 u and a second weight percent of HFP greater than 13 percent. In some embodiments, the second PVdF-HFP copolymer has a second molecular weight less than or equal to 750,000 u and a second weight percent of HFP greater than 14 percent.

In certain variations of the cell stack 300, the separator 316 includes a polyolefin layer having a first side 320 and a second side 322 (i.e., the microporous polymer membrane or non-woven fabric mat 318 is a polyolefin layer). Non-limiting examples of the polyolefin layer include a polyethylene layer, a polypropylene layer, a layer having of a blend of polyethylene and polypropylene, and combinations thereof. The first side 320 forms a first interface 324 with the cathode active material 306. The second side 322 forms a second interface 326 with the anode active material 312. The binder 302 (or portions thereof) may be disposed as layers along the first interface 324 and the second interface 326 as shown in FIG. 3A.

Figure 3B:
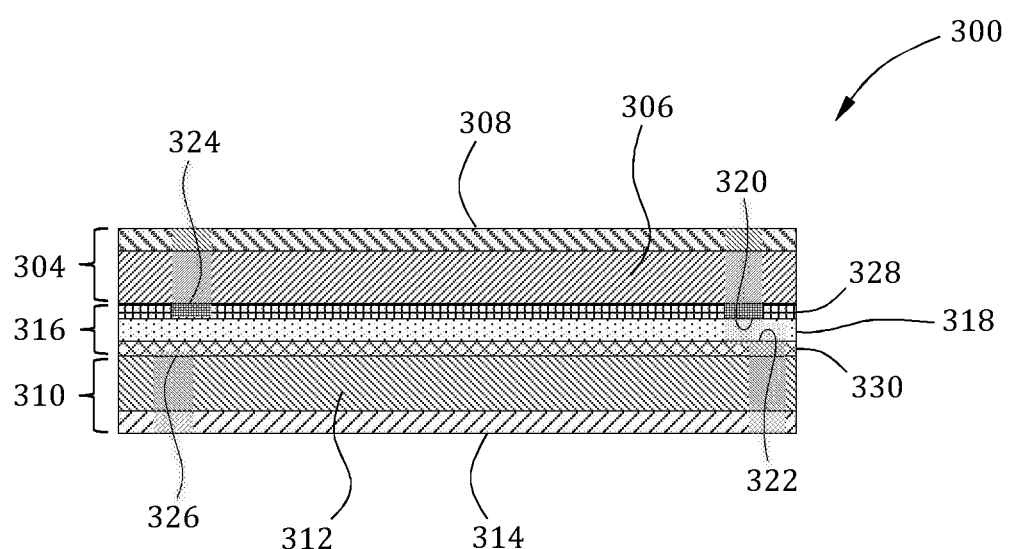
FIG. 3B is a side view of the cell stack of FIG. 3A, but in which the separator includes ceramic layers, according to an illustrative embodiment.

In these variations of the cell stack 300, ceramic layers may be disposed along the first interface 324 and the second interface 326. Such ceramic layers may improve a chemical and dimensional stability of the separator 316 during operation of the battery stack 300 (i.e., after manufacturing). Such ceramic layers may also improve a mechanical strength of the separator 316. Non-limiting examples of ceramic materials for the ceramic layers include magnesium oxide materials (e.g., $Mg(OH)_2$, MgO, etc.) and aluminum oxide materials (e.g., $Al_2O_3$). FIG. 3B presents a side view of the cell stack 300 of FIG. 3A, but in which the separator 316 includes ceramic layers, according to an illustrative embodiment.

In some instances, a first ceramic layer 328 is disposed along the first interface 324. The first ceramic layer 328 includes a first plurality of ceramic particles in contact with the binder 302. In some instances, a second ceramic layer 330 is disposed along the second interface 326. The second ceramic layer 330 includes a second plurality of ceramic particles in contact with the binder 302. In other instances, the first ceramic layer 328 is disposed along the first interface 324 and the second ceramic layer 330 is disposed along the second interface 326. In these instances, the first ceramic layer 328 includes the first plurality of ceramic particles in contact with the binder 302 and the second ceramic layer 330 includes the second plurality of ceramic particles in contact with the binder 302.

Contact with the binder 302 may involve ceramic particles blended with the binder 302. In these instances, the first plurality of ceramic particles and the second plurality of ceramic particles may represent 60-90 wt. % of, respectively, the first ceramic layer 328 and the second ceramic layer 330. In other instances, the first plurality of ceramic particles and the second plurality of ceramic particles represent less than or equal to 50 wt. % of, respectively, the first ceramic layer 328 and the second ceramic layer 330. In still other instances, the first plurality of ceramic particles and the second plurality of ceramic particles represent greater than or equal to 90 wt. % of, respectively, the first ceramic layer 328 and the second ceramic layer 330.

Contact with the binder 302 may also involve ceramic particles contacting layers of the binder 302. Such layers of the binder 302 may be interposed between the first ceramic layer 328 and the cathode active material 306, between the second ceramic layer 330 and the anode active material 312, or any combination thereof.

Figure 4:
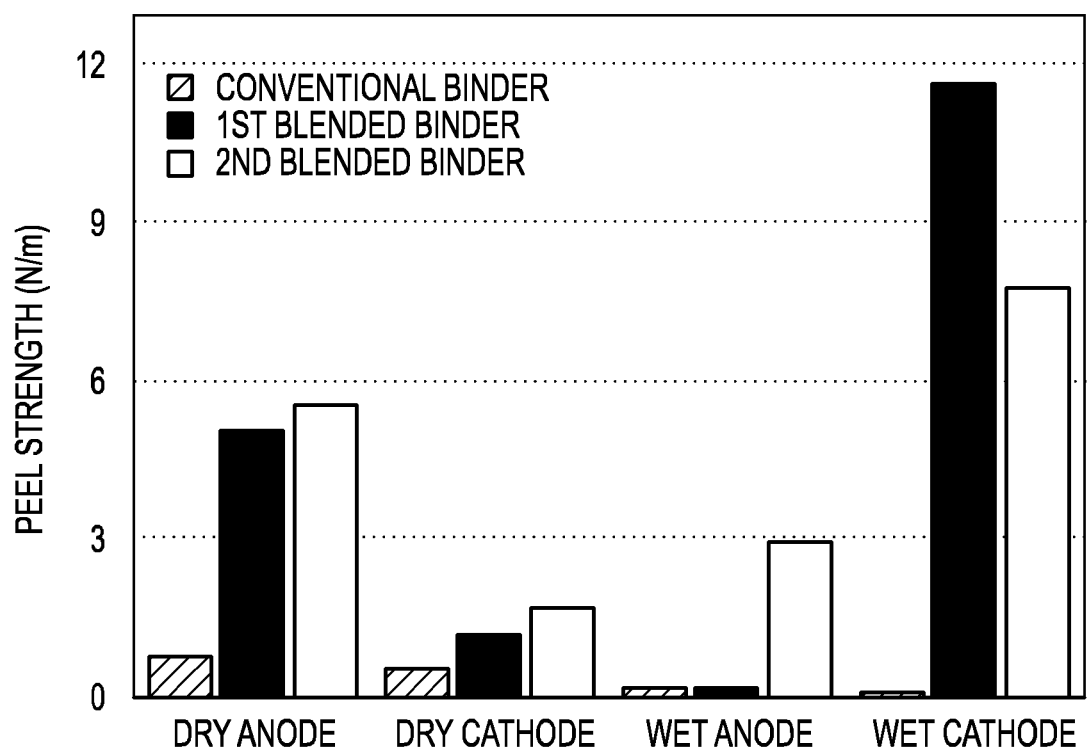
FIG. 4 is a plot of data representing a peel strength of a cell stack formed using a blended binder, according to an illustrative embodiment.

FIG. 4 presents a plot of data representing a peel strength of a cell stack formed using a blended binder, according to an illustrative embodiment. The peel strength of the cell stack is indicated on the ordinate. The abscissa indicates peel strengths corresponding to dry and wet lamination processes. For each lamination process, a cell stack was formed using a separator adhered to a cathode or and a separator adhered to an anode. Thus, the plot of data presents four conditions for which peel strengths were measured.

Three different binders were used for each condition, including a conventional (non-blended) binder, a first blended binder, and a second blended binder. The conventional binder had a PVdF-HFP copolymer with a molecular weight of 1,200,000 u, a weight percent of HFP of 6 percent, and an acid value of 1 milligrams of potassium hydroxide per gram of copolymer. The first blended binder had a first PVdF-HFP copolymer with a molecular weight of 1,100,000 u, a weight percent of HFP of 5 percent, and an acid value of 13 milligrams of potassium hydroxide per gram of copolymer, and a second PVdF-HFP copolymer with a molecular weight of 1,200,000 u, a weight percent of HFP of zero, and an acid value of 10 milligrams of potassium hydroxide per gram of copolymer. The second blended binder had a first PVdF-HFP copolymer with a molecular weight of 1,100,000 u, a weight percent of HFP of 5 percent, and an acid value of 13 milligrams of potassium hydroxide per gram of copolymer, and a second PVdF-HFP copolymer with a molecular weight of 860,000 u, a weight percent of HFP of 12 percent, and an acid value of 2 milligrams of potassium hydroxide per gram of copolymer. Separators in the cell stacks included a first ceramic layer and a second ceramic layer coated on opposite sides of a polyethylene base film. The first and second ceramic layers were prepared from blends corresponding to 70 wt. % of $Mg(OH)_2$ and 30 wt. % of the blended binder. The first and second ceramic layers were solution-cast onto separators of the cell stacks. Activation temperatures for the wet and dry lamination processes were 85° C. The cathode active material in the cathode included a mixture of lithium cobalt oxide material, PVdF binder, and active carbon. The anode active material in the anode included graphite, SBR, and CMC. To laminate the cell stack, a pressure of about 1 MPa was applied.

In FIG. 4, the peel strengths of the first and second blended binders are clearly higher than those of the conventional (non-blended) binder. Moreover, in all conditions, the second blended binder exhibits peel strengths that exceed 1.5 N/m. In contrast, peel strengths of the conventional binder are below 1.5 N/m for all conditions. The first blended binder meets or exceeds 1.5 N/m in all conditions expect when adhering the separator to the anode in a wet process. However, it will be appreciated that the first and second blended binder are both suitable for use in wet and dry processing.

It will be appreciated that those skilled in the art may utilize techniques of differential scanning calorimetry (DSC) to differentiate between melting temperatures of blended binders using heat flow profiles. Such heat flow profiles may allow weight percentages to be determined for PVdF-HFP copolymers within the blended binders. Moreover, those skilled in the art may also utilize gel permeation chromatography (GPC) to determine molecular weights of PVdF-HFP copolymers within the blended binders.

According to an illustrative embodiment, a method for laminating at least one cell stack of a battery cell includes the step of contacting a separator with a first active material of a first electrode to form a first cell stack. The separator includes a binder comprising a PVdF-HFP copolymer. The PVdF-HFP copolymer has a molecular weight greater than or equal to 1,000,000 u and a weight percent of HFP from 5 to 15 percent. In some embodiments, the PVdF-HFP copolymer has an acid value from 3 to 15 milligrams of potassium hydroxide per gram of copolymer. In some embodiments, the PVdF-HFP copolymer has an acid value from 1.5 to 15 milligrams of potassium hydroxide per gram of copolymer.

The method also includes the step of heating the first cell stack to laminate the separator to the first electrode. The first active material of the first electrode may be a cathode active material of a cathode or an anode active material of an anode. In some embodiments, the method additionally includes the step of, before heating the first cell stack, soaking the separator with an electrolyte fluid. In some embodiments, the method additionally includes the step of, after heating the first cell stack, soaking the separator with the electrolyte fluid and heating the first cell stack again. It will be appreciated that a presence or absence of electrolyte fluid in the separator corresponds to, respectively, a wet lamination process and a dry lamination process.

In some variations, the PVdF-HFP copolymer has a molecular weight greater than or equal to 1,000,000 u and a weight percent of HFP from 5 to 15 percent. In further variations, the PVdF-HFP copolymer has an acid value from 3 to 15 milligrams of potassium hydroxide per gram of copolymer. In further variations, the PVdF-HFP copolymer has an acid value from 1.5 to 15 milligrams of potassium hydroxide per gram of copolymer.

In some variations, the PVdF-HFP copolymer has a molecular weight greater than or equal to 1,000,000 u and a weight percent of HFP greater than or equal to 5 percent. In some variations, the PVdF-HFP copolymer has a molecular weight greater than or equal to 1,000,000 u and a weight percent of HFP greater than or equal to 10 percent. In some variations, the PVdF-HFP copolymer has a molecular weight greater than or equal to 1,000,000 u and a weight percent of HFP greater than or equal to 15 percent. In some variations, the PVdF-HFP copolymer has a molecular weight greater than or equal to 1,000,000 u and a weight percent of HFP greater than or equal to 20 percent.

In some variations, the PVdF-HFP copolymer has a molecular weight greater than or equal to 1,000,000 u and a weight percent of HFP less than or equal to 25 percent. In some variations, the PVdF-HFP copolymer has a molecular weight greater than or equal to 1,000,000 u and a weight percent of HFP less than or equal to 20 percent. In some variations, the PVdF-HFP copolymer has a molecular weight greater than or equal to 1,000,000 u and a weight percent of HFP less than or equal to 15 percent. In some variations, the PVdF-HFP copolymer has a molecular weight greater than or equal to 1,000,000 u and a weight percent of HFP less than or equal to 10 percent.

In some variations, the PVdF-HFP copolymer has an acid value greater than or equal to 1.5 milligrams of potassium hydroxide per gram of copolymer. In some variations, the PVdF-HFP copolymer has an acid value greater than or equal to 3 milligrams of potassium hydroxide per gram of copolymer. In some variations, the PVdF-HFP copolymer has an acid value greater than or equal to 8 milligrams of potassium hydroxide per gram of copolymer. In some variations, the PVdF-HFP copolymer has an acid value greater than or equal to 13 milligrams of potassium hydroxide per gram of copolymer. In some variations, the PVdF-HFP copolymer has an acid value greater than or equal to 12 milligrams of potassium hydroxide per gram of copolymer. In some variations, the PVdF-HFP copolymer has an acid value greater than or equal to 18 milligrams of potassium hydroxide per gram of copolymer.

In some variations, the PVdF-HFP copolymer has an acid value less than 20 milligrams of potassium hydroxide per gram of copolymer. In some variations, the PVdF-HFP copolymer has an acid value less than or equal to 15 milligrams of potassium hydroxide per gram of copolymer. In some variations, the PVdF-HFP copolymer has an acid value less than or equal to 10 milligrams of potassium hydroxide per gram of copolymer. In some variations, the PVdF-HFP copolymer has an acid value less than or equal to 5 milligrams of potassium hydroxide per gram of copolymer.

In some embodiments, the step of contacting the separator with the first active material of the first electrode includes contacting the separator with a second active material of a second electrode. In these embodiments, the separator is disposed between the first electrode and the second electrode to form the first cell stack. The step of heating the first cell stack laminates the separator to both the first electrode and the second electrode. In certain instances, the method includes the step of, before heating the first cell stack, soaking the separator with the electrolyte fluid. In other instances, the method includes the step of, after heating the first cell stack, soaking the separator with the electrolyte fluid and re-heating the first cell stack.

In other embodiments, the method further includes the step of contacting the separator of the first cell stack with the second active material of the second electrode, thereby forming a second cell stack. The method also includes the step of heating the second cell stack to laminate the separator to the second electrode. In certain instances, the method may involve the step of, before heating the second cell stack, soaking the separator with an electrolyte fluid. In other instances, the method may involve the step of, after heating the second cell stack, soaking the separator with the electrolyte fluid and then heating the second cell stack again.

In still other embodiments, the method includes the step of, before heating the first cell stack, soaking the separator with the electrolyte fluid. In such embodiments, the method also includes the step of, after heating the first cell stack, contacting the separator of the first cell stack with the second active material of the second electrode, thereby forming the second cell stack. The second cell stack is heated to laminate the separator to the second electrode. In certain instances, the method may involve the step of, before heating the second cell stack, soaking the separator with an electrolyte fluid. In other instances, the method may involve the step of, after heating the second cell stack, soaking the separator with the electrolyte fluid and then heating the second cell stack again.

According to another illustrative embodiment, a method for laminating at least one cell stack of battery cell includes the step of contacting a separator with a first active material of a first electrode to form a first cell stack. The separator includes a blended binder comprising a first PVdF-HFP copolymer and a second PVdF-HFP copolymer. The first PVdF-HFP copolymer has a first molecular weight greater than or equal to 1,000,000 u and a first weight percent of HFP less than or equal to 7 percent. The second PVdF-HFP copolymer has a second molecular weight from 500,000 to 1,000,000 u and a second weight percent of HFP from 10 to 15 percent. In some embodiments, first PVdF-HFP copolymer and the second PVdF-HFP copolymer have respective acid values from 3 to 15 milligrams of potassium hydroxide per gram of copolymer.

The method also includes the step of heating the first cell stack to laminate the separator to the first electrode. The first active material of the first electrode may be a cathode active material of a cathode or an anode active material of an anode. In some embodiments, the method additionally includes the step of, before heating the first cell stack, soaking the separator with an electrolyte fluid. In some embodiments, the method additionally includes the step of, after heating the first cell stack, soaking the separator with the electrolyte fluid and heating the first cell stack again. It will be appreciated that a presence or absence of electrolyte fluid in the separator corresponds to, respectively, a wet lamination process and a dry lamination process.

In some variations, the first PVdF-HFP copolymer has a first molecular weight greater than or equal to 1,000,000 u and a first weight percent of HFP less than or equal to 10 percent. In some variations, the first PVdF-HFP copolymer has a first molecular weight greater than or equal to 1,000,000 u and a first weight percent of HFP less than or equal to 8 percent. In some variations, the first PVdF-HFP copolymer has a first molecular weight greater than or equal to 1,000,000 u and a first weight percent of HFP less than or equal to 6 percent. In some variations, the first PVdF-HFP copolymer has a first molecular weight greater than or equal to 1,000,000 u and a first weight percent of HFP less than or equal to 4 percent. In some variations, the first PVdF-HFP copolymer has a first molecular weight greater than or equal to 1,000,000 u and a first weight percent of HFP less than or equal to 2 percent.

In some variations, the first PVdF-HFP copolymer has a first molecular weight greater than or equal to 1,000,000 u and a first weight percent of HFP from 1 to 3 percent. In some variations, the first PVdF-HFP copolymer has a first molecular weight greater than or equal to 1,000,000 u and a first weight percent of HFP from 3 to 5 percent. In some variations, the first PVdF-HFP copolymer has a first molecular weight greater than or equal to 1,000,000 u and a first weight percent of HFP from 5 to 7 percent. In some variations, the first PVdF-HFP copolymer has a first molecular weight greater than or equal to 1,000,000 u and a first weight percent of HFP from 7 to 9 percent.

In some variations, the first PVdF-HFP copolymer has a first molecular weight greater than or equal to 1,000,000 u and a first weight percent of HFP from 1 to 9 percent. In some variations, the first PVdF-HFP copolymer has a first molecular weight greater than or equal to 1,000,000 u and a first weight percent of HFP from 3 to 7 percent. In some variations, the first PVdF-HFP copolymer has a first molecular weight greater than or equal to 1,000,000 u and a first weight percent of HFP from 1 to 5 percent. In some variations, the first PVdF-HFP copolymer has a first molecular weight greater than or equal to 1,000,000 u and a first weight percent of HFP from 5 to 9 percent.

In some variations, the second PVdF-HFP copolymer has a second molecular weight greater than or equal to 750,000 u and a second weight percent of HFP less than 14 percent. In some variations, the second PVdF-HFP copolymer has a second molecular weight greater than or equal to 750,000 u and a second weight percent of HFP less than 13 percent. In some variations, the second PVdF-HFP copolymer has a second molecular weight greater than or equal to 750,000 u and a second weight percent of HFP less than 12 percent. In some variations, the second PVdF-HFP copolymer has a second molecular weight greater than or equal to 750,000 u and a second weight percent of HFP less than 11 percent.

In some variations, the second PVdF-HFP copolymer has a second molecular weight greater than or equal to 750,000 u and a second weight percent of HFP greater than 11 percent. In some variations, the second PVdF-HFP copolymer has a second molecular weight greater than or equal to 750,000 u and a second weight percent of HFP greater than 12 percent. In some variations, the second PVdF-HFP copolymer has a second molecular weight greater than or equal to 750,000 u and a second weight percent of HFP greater than 13 percent. In some variations, the second PVdF-HFP copolymer has a second molecular weight greater than or equal to 750,000 u and a second weight percent of HFP greater than 14 percent.

In some variations, the second PVdF-HFP copolymer has a second molecular weight less than or equal to 750,000 u and a second weight percent of HFP less than 14 percent. In some variations, the second PVdF-HFP copolymer has a second molecular weight less than or equal to 750,000 u and a second weight percent of HFP less than 13 percent. In some variations, the second PVdF-HFP copolymer has a second molecular weight less than or equal to 750,000 u and a second weight percent of HFP less than 12 percent. In some variations, the second PVdF-HFP copolymer has a second molecular weight less than or equal to 750,000 u and a second weight percent of HFP less than 11 percent.

In some variations, the second PVdF-HFP copolymer has a second molecular weight less than or equal to 750,000 u and a second weight percent of HFP greater than 11 percent. In some variations, the second PVdF-HFP copolymer has a second molecular weight less than or equal to 750,000 u and a second weight percent of HFP greater than 12 percent. In some variations, the second PVdF-HFP copolymer has a second molecular weight less than or equal to 750,000 u and a second weight percent of HFP greater than 13 percent. In some variations, the second PVdF-HFP copolymer has a second molecular weight less than or equal to 750,000 u and a second weight percent of HFP greater than 14 percent.

In some embodiments, the step of contacting the separator with the first active material of the first electrode includes contacting the separator with a second active material of a second electrode. In these embodiments, the separator is disposed between the first electrode and the second electrode to form the first cell stack. The step of heating the first cell stack laminates the separator to both the first electrode and the second electrode. In certain instances, the method includes the step of, before heating the first cell stack, soaking the separator with the electrolyte fluid. In other instances, the method includes the step of, after heating the first cell stack, soaking the separator with the electrolyte fluid and heating the first cell stack again.

In other embodiments, the method further includes the step of contacting the separator of the first cell stack with the second active material of the second electrode, thereby forming a second cell stack. The method also includes the step of heating the second cell stack to laminate the separator to the second electrode. In certain instances, the method may involve the step of, before heating the second cell stack, soaking the separator with an electrolyte fluid. In other instances, the method may involve the step of, after heating the second cell stack, soaking the separator with the electrolyte fluid and then heating the second cell stack again.

In still other embodiments, the method includes the step of, before heating the first cell stack, soaking the separator with the electrolyte fluid. In such embodiments, the method also includes the step of, after heating the first cell stack, contacting the separator of the first cell stack with the second active material of the second electrode, thereby forming the second cell stack. The second cell stack is heated to laminate the separator to the second electrode. In certain instances, the method may involve the step of, before heating the second cell stack, soaking the separator with an electrolyte fluid. In other instances, the method may involve the step of, after heating the second cell stack, soaking the separator with the electrolyte fluid and then heating the second cell stack again.

The cell stacks described herein can be valuable in the manufacturing of electronic devices, including battery cells that are fabricated with wet lamination processes, dry lamination processes, or both. An electronic device herein can refer to any electronic device known in the art. For example, the electronic device can be a telephone, such as a cell phone, and a land-line phone, or any communication device, such as a smart phone, including, for example an iPhone®, an electronic email sending/receiving device. The electronic device can also be an entertainment device, including a portable DVD player, conventional DVD player, Blue-Ray disk player, video game console, music player, such as a portable music player (e.g., iPod®), etc. The electronic device can be a part of a display, such as a digital display, a TV monitor, an electronic-book reader, a portable web-browser (e.g., iPad®), watch (e.g., AppleWatch), or a computer monitor. The electronic device can also be a part of a device that provides control, such as controlling the streaming of images, videos, sounds (e.g., Apple TV®), or it can be a remote control for an electronic device. Moreover, the electronic device can be a part of a computer or its accessories, such as the hard drive tower housing or casing, laptop housing, laptop keyboard, laptop track pad, desktop keyboard, mouse, and speaker. The anode cells, lithium-metal batteries, and battery packs can also be applied to a device such as a watch or a clock.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A separator comprising:
   a polyolefin layer; and
   a first ceramic layer disposed on a first side of the polyolefin layer,
   wherein the first ceramic layer comprises ceramic particles blended with a binder;
   the binder comprising a first PVdF-HFP copolymer and a second PVdF-HFP copolymer;
     wherein the first PVdF-HFP copolymer has a first molecular weight greater than or equal to 1,000,000 grams per mole and a first weight percent of HFP less than or equal to 7 percent;
     wherein the second PVdF-HFP copolymer has a second molecular weight from 500,000 to 1,000,000 grams per mole and a second weight percent of HFP from 10 to 15 percent; and
     wherein the first PVdF-HFP copolymer and the second PVdF-HFP copolymer have respective acid values from 1.5 to 15 milligrams of potassium hydroxide per gram of copolymer.

2. The separator of claim 1, wherein
   the first PVdF-HFP copolymer has a first acid value of 2.1 milligrams of potassium hydroxide per gram of copolymer, and
   the second PVdF-HFP copolymer has a second acid value of 12.6 milligrams of potassium hydroxide per gram of copolymer.

3. The separator of claim 1, wherein the first plurality of ceramic particles comprise magnesium hydroxide.

4. The separator of claim 1, wherein the first plurality of ceramic particles represent 60-90 wt % of the first ceramic layer.

5. The separator of claim 4, wherein the first plurality of ceramic particles comprise magnesium hydroxide.

6. The separator of claim 1, comprising a second ceramic layer disposed on a second side of the polyolefin layer.

7. The separator of claim 6, wherein the second ceramic layer comprises magnesium hydroxide.

8. The separator of claim 6, wherein the second ceramic layer comprises a second plurality of ceramic particles blended with the binder.

9. The separator of claim 8, wherein the second plurality of ceramic particles represent 60-90 wt % of the second ceramic layer.

10. The separator of claim 9, wherein the second ceramic layer comprises magnesium hydroxide.

11. The separator of claim 6, wherein the second ceramic layer comprises a second plurality of ceramic particles blended with the binder.

12. The separator of claim 11, wherein the second plurality of ceramic particles represent 60-90 wt % of the second ceramic layer.

13. The separator of claim 12, wherein the second ceramic layer comprises magnesium hydroxide.

14. A cell stack for a battery cell comprising:
   a cathode comprising a cathode active material disposed on a cathode current collector;
   an anode comprising an anode active material disposed on an anode current collector, the anode oriented towards the cathode such that the anode active material faces the cathode active material;
   the separator of claim 1 disposed between the cathode active material and anode active material.

15. The cell stack of claim 14, wherein
   the first PVdF-HFP copolymer has a first acid value of 2.1 milligrams of potassium hydroxide per gram of copolymer, and
   the second PVdF-HFP copolymer has a second acid value of 12.6 milligrams of potassium hydroxide per gram of copolymer.

16. The cell stack of claim 14, wherein the first plurality of ceramic particles comprise magnesium hydroxide.

17. The cell stack of claim 14, wherein the first plurality of ceramic particles represent 60-90 wt % of the first ceramic layer.

18. The cell stack of claim 17, wherein the first plurality of ceramic particles comprise magnesium hydroxide.

19. The cell stack of claim 14, comprising a second ceramic layer disposed on a second side of the polyolefin layer.

20. The cell stack of claim 19, wherein the second ceramic layer comprises magnesium hydroxide.

* * * * *